United States Patent [19]

Janssen

[11] 4,191,792
[45] Mar. 4, 1980

[54] PAINT ROLLER

[75] Inventor: Robert I. Janssen, St. Paul, Minn.

[73] Assignee: Padco, Inc., Minneapolis, Minn.

[21] Appl. No.: 955,918

[22] Filed: Oct. 30, 1978

[51] Int. Cl.$^2$ .................. B05D 5/02; B05C 17/02; B05D 1/28
[52] U.S. Cl. .................. 427/260; 15/230.11; 29/120; 427/428; 428/36; D4/38.1
[58] Field of Search .................. 15/230.11; 29/120; D4/38.1; 428/36; 427/260, 420

[56] References Cited

U.S. PATENT DOCUMENTS

| | | | |
|---|---|---|---|
| D. 241,274 | 8/1976 | Hori | D4/38.1 |
| D. 241,374 | 9/1976 | Hori | D4/38.1 |
| D. 241,375 | 9/1976 | Hori | D4/38.1 |
| 2,234,761 | 3/1941 | Harpootlian | 15/230.11 |
| 2,368,513 | 1/1945 | Adams | 15/230.11 |
| 2,778,050 | 1/1957 | Meinhardt | 15/230.11 |
| 2,824,326 | 2/1958 | Ames | 29/120 |
| 3,226,799 | 1/1966 | Grodberg et al. | 29/120 |
| 3,837,988 | 9/1974 | Hennen et al. | 429/91 |
| 3,955,260 | 5/1976 | Sherden | 15/230.11 |
| 4,103,450 | 8/1978 | Whitcomb | 428/288 |
| 4,105,816 | 8/1978 | Hori | 427/260 |

FOREIGN PATENT DOCUMENTS 1247373 9/1971 United Kingdom .

Primary Examiner—William R. Dixon, Jr.
Attorney, Agent, or Firm—Kinney, Lange, Braddock, Westman and Fairbairn

[57] ABSTRACT

A paint roller for producing texture paint surfaces having a cylindrical core with a paint applying and texturing cover bonded to the outer surface of the cylindrical core. The paint applying and texturing cover is an open web of interengaged continuous crinkled coarse filaments of resilient material. The open loops of the open web carry the texture paint material, apply it to the surface being painted, and texture it in essentially a single motion. During application, the loop elements are actually immersed in the texture paint material and lift it into peaks, thereby producing deeper textures than has generally been possible in the past.

15 Claims, 4 Drawing Figures

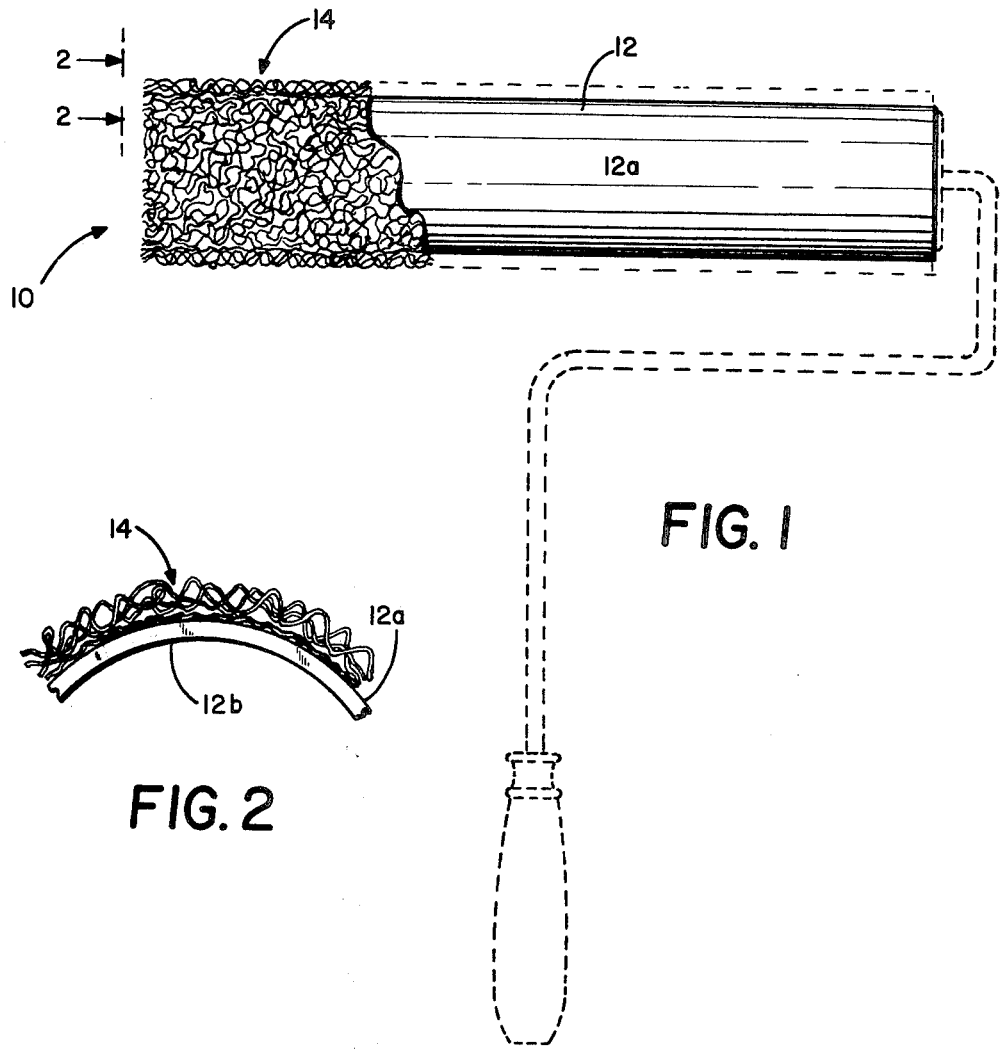
FIG. 1
FIG. 2
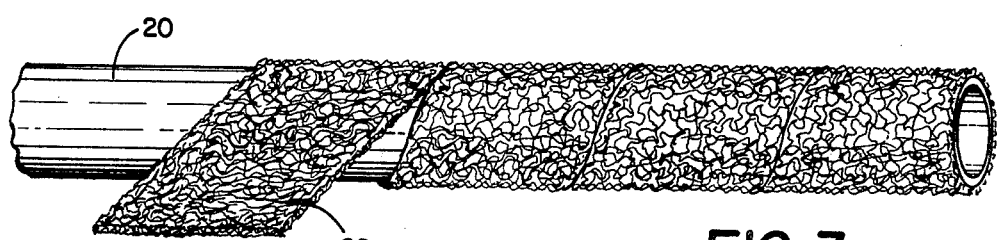
FIG. 3
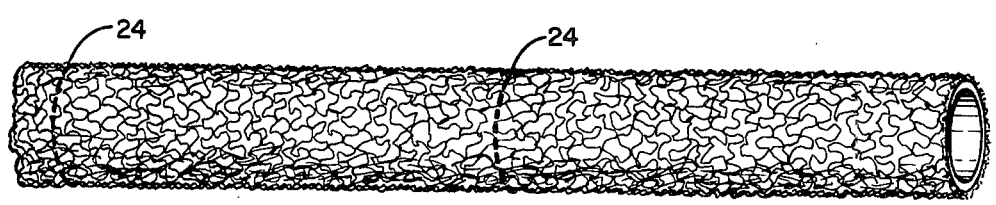
FIG. 4

PAINT ROLLER

BACKGROUND OF THE INVENTION

1. Field of the Invention

The present invention relates to paint roller apparatus. In particular, the present invention relates to a paint roller for applying and texturing texture paint material.

2. Description of the Prior Art

Textured wall and ceiling surfaces are often desirable, and are quite common in most residences. Although there are a wide variety of texture paint materials which are commercially available, the application of these materials to produce a uniform and attractive textured surface has been difficult. This is particularly the case for persons making do-it-yourself home improvements, who have limited experience in applying the texture paint materials.

A wide variety of make-shift tools have been used in the past to produce textured surfaces by scoring, gouging or displacing portions of the texture paint, dabbing the texture paint, or rolling the texture paint. Scoring of the texture paint is typically performed using a whiskbroom, comb, corrugated board, or the like. Gouging or displacing portions of the texture paint is usually performed with a trowel. Dabbing to create a textured surface has been performed with a trowel, paint brush, crumpled paper or the like. Rolling the texture paint to create the texture surface has been performed using conventional paint rollers.

In addition to these make-shift techniques, special applicators have been sold for texture painting. These applicators include carpet rollers, mohair rollers, and foam rollers. In some cases, the foam rollers have even had sculptured surfaces to increase the texture effects.

Both the make-shift techniques and the special applicators for texture painting have significant disadvantages. Both techniques require two stages of application, and except for the use of a trowel, each requires two different tools. The first tool spreads the texture paint material on the wall or ceiling, while the second tool textures the applied material. Even the special applicators made for texture painting require paints (especially the thicker ones) to be troweled on before rolling. In general, the make-shift methods and tools are hard to control, particularly for an individual making a do-it-yourself home improvement. The make-shift tools often leave unexpected irregularities, have bristles fall out, or suffer from disintegrating paper used for dabbing or scoring.

The prior art rollers which have been specifically marketed for texture painting are limited in the depth of texture that they can create. This is because of the method by which the carpet, mohair, or foam rollers produce the stippled or textured surface. As these rollers roll, they stick to the wet surface and pull up the texture paint material into peaks. This "plucking" affects only the surface of the coating, resulting in very minimal texture effects.

SUMMARY OF THE INVENTION

The paint roller of the present invention utilizes an open web of interengaged continuous crinkled coarse filaments of resilient material bonded to the outer surface of a cylindrical roller core. The open loops of the web have substantial interstitial open areas between the filaments forming the loops, which permit application and texturing of texture paint in essentially a single motion. The roller actually carries the texture paint material to the wall or ceiling, applies it, and textures it, all with the same tool and in essentially the same motion. Unlike the prior art applicators for texture painting, the paint roller of the present invention gives deeper textures between the loop elements are actually immersed in the texture paint material and lift it into peaks, rather than just plucking the surface.

The paint roller of the present invention is preferably fabricated by providing a cylindrical core having inner and outer surfaces and a length which is greater than the desired paint roller length. An open web of interengaged continuous crinkled coarse filaments of resilient material is then spirally bonded to the outer surface of the cylindrical core in edge-to-edge relationship. After the open web has been spirally bonded to the core, individual paint rollers of the desired paint roller length are cut from the core. The spiral bonding creates an essentially continuous and seam-free web on the outer surface of the cylindrical core.

BRIEF DESCRIPTION OF THE DRAWINGS

FIG. 1 shows the paint roller of the present invention with the roller cover partially broken away, together with a typical roller arm, which is shown in phantom.

FIG. 2 is a partial end view of a paint roller of the present invention illustrating the interengaged continuous crinkled coarse filaments of resilient material which form loop elements to apply texture paint and create a textured effect on a wall or ceiling.

FIGS. 3 and 4 illustrate the method by which the paint roller of the present invention is fabricated.

DETAILED DESCRIPTION OF THE PREFERRED EMBODIMENTS

In FIG. 1, texture paint roller 10 of the present invention is shown. Paint roller 10 is of the type which is normally attached to a roller handle assembly, which is illustrated in phantom in FIG. 1. The roller handle assembly forms no part of the present invention, and texture paint roller 10 is constructed to work successfully with a variety of forms of roller handle assemblies.

Texture paint roller 10 has a cylindrical core 12. Attached to the outer surface 12a of core 12 is a paint applying and texturing cover 14 in the form of an open web of interengaged continuous crinkled coarse filaments of resilient material. In FIG. 1, cover 14 is not shown on the entire outer surface 12a of core 12 for illustrative purposes only. In the preferred embodiments of the present invention, of course, cover 14 extends over the entire outer surface 12a of core 12.

FIG. 2 is a sectional view showing a portion of core 12 and cover 14 in greater detail. As illustrated in FIG. 2, core 12 has an outer surface 12a and an inner surface 12b. Cover 14 is attached to outer surface 12a of core 12. The interengaged continuous crinkled coarse filaments which form cover 14 create open loops which carry, apply, and texture the texture paint material. As shown in FIG. 2, the portions of cover 14 which are closest to surface 12a have a higher concentration of filaments than those portions proximate the outer surface. The open loop structure near the outer surfaces of cover 14 acts as loop elements during application and texturing of the texture paint material.

The texture paint roller of the present invention has significant advantages over the conventional tools and methods which have been used to create textured surfaces. First, the texture paint roller of the present invention requires only one application step. The loop elements of cover 14 bite into even the thickest texture paints, so that the roller 10 actually carries the paint to the wall or ceiling surface, applies it, and textures it, all with the same tool and in essentially the same motion.

To create a textured surface using the texture paint roller of the present invention, the texture paint material is poured or scooped into a shallow container. The texture paint roller 10 is filled or loaded with the texture paint material generously by "plowing" deeply into the paint several times. The paint is then rolled directly onto the wall or ceiling. The user then continues to roll for the desired texture effects.

Second, the texture effects produced by the texture paint roller of the present invention are easy to control. With only the most basic control of coating thickness and rolling pressure, the texture paint roller of the present invention produces a uniform texture which is easy to match from one stroke or surface area to the next. Among the basic textures which can be produced are a deep texture, which is created by applying the texture paint material thickly and rolling with light pressure, and a fine texture which is created by using less paint and pressing harder while rolling. Other effects may also be produced. For example, ridges can be created by applying a thick coating with the texture paint roller of the present invention and rolling fast, thereby causing the roller to partially skid. Classic stucco effects can be produced by applying the texture paint material with the texture paint roller of the present invention, and then using a clean wet trowel to gently smooth the peaks of the partially set texture paint.

Third, because cover 14 is an open web of interengaged continuous filaments, there are no loose or easily detachable parts of the roller material to fall off. Similarly, there are no water soluble parts of the texture paint roller of the present invention which can disintegrate during use.

Fourth, the texture paint roller of the present invention gives deeper textures than the conventional tools. The loop elements of cover 14 are actually immersed in the texture paint coating and lift it into peaks, rather than just "plucking" at the surface as is done with the prior art rollers. In other words, the texture paint roller of the present invention actually gets under the surface of the wet texture paint coating to lift it into peaks. The roller of the present invention, therefore, affects more than just the surface of the texture paint coating, thereby creating much deeper texture effects.

In one preferred embodiment of the present invention, cover 14 is an unbacked surfacing material known as "Nomad" which is manufactured by Minnesota Mining and Manufacturing Company as Product No. 61-2015-1033-8. This material, which is described in U.S. Pat. No. 3,837,988 and in British Pat. No. 1,247,373, is a floor mat material. The "Nomad" floor mat material has interengaged continuous crinkled coarse filaments of resilient thermoplastic polymeric material. The filaments are preferably coated with an organic resin over their entire structure to permanently bond the filaments together.

In this preferred embodiment of the present invention, cylindrical core 12 is a phenolic impregnated paper tube. In one preferred embodiment, in which roller 10 has a length of 9 inches, the dimensions of cylindrical core 10 are 9 inches long by 1.485 inches diameter by 0.060 inches wall thickness.

Cover material 14 must be securely and reliably bonded to outer surface 12a of cylindrical core 12. In the preferred embodiment discussed above the adhesive must successfully bond the thermoplastic polymeric material which forms the "Nomad" floor mat material to outer surface 12a of the phenolic impregnated paper core 12. In this preferred embodiment of the present invention, a two part epoxy manufactured by Epic Resins as Product No. 57005 has been found to produce particularly good results.

FIGS. 3 and 4 illustrate the method by which the texture paint roller of the present invention is fabricated. As shown in FIG. 3, a core 20, which is preferably phenolic impregnated paper tubing, is provided. The length of core 20 is much greater than the desired paint roller length, so that several paint rollers are ultimately fabricated from core 20. In one preferred embodiment, core 20 has a length of 67 inches, a diameter of 1.485 inches ± 0.005 inches, and a wall thickness of 0.060 inches.

As illustrated in FIG. 3, cover strip 22, which is an open web of interengaged continuous coarse filaments of resilient material, is spirally wound and bonded to the core 20. In one preferred embodiment, in which "Nomad" floor mat material is used, the width of cover strip 22 is about 3 inches. The "Nomad" floor mat material is initially supplied in rolls of 3 feet width by 20 feet length, and is slit into coils of 3 inches by 20 feet before processing.

The spiral winding of open web material 22 onto core 20 has been found to be particularly advantageous, since it eliminates any noticeable seam in the resulting cover. The width of strip 22 is preferably less than the desired paint roller length, and in the preferred embodiment is about one-third of the desired paint roller length. In most cases, no noticeable seam is present in the finished paint roller, and no adverse effect or irregularities in the texture are created as the result of a seam in the cover when the texture paint material is applied.

After the adhesive which bonds strip 22 to cover 20 has cured, the full length core 20 is cut into pieces of the desired paint roller length. FIG. 4 illustrates, by dotted lines 24, the desired cut locations.

In conclusion, the present invention represents a significant advance in texture painting tools. Prior to the present invention, the texture painting tools have either been make-shift, or have been rollers which created very limited texture effects. The make-shift methods are often difficult to use and control, and have done little for customer buying confidence. The prior art techniques have required two stages: a first step in which the coating is spread on the wall or celing, and a second step in which the coating is textured. In addition, most of them have required two different tools, one for spreading, and another for texturing. With many of the make-shift methods, the user has had difficulty controlling the texture. In addition, the applicators and tools have created unexpected irregularities, and have suffered from bristles falling out, or disintegration.

The texture paint roller of the present invention, on the other hand, requires only one application step. Application and texturing is done with the same tool and essentially the same motion. The effects are easy to control, and there are no loose or easily detachable parts, and no water soluble parts which disintegrate. Finally, the texture paint roller of the present invention provides deeper textures than has been possible with the prior art rollers which have been specially developed for texture painting, because the loop elements of the present invention actually get under the surface of the texture paint and lift it into peaks.

Although the present invention has been described with reference to preferred embodiments, workers skilled in the art will recognize that changes may be made in form and detail without departing from the spirit of the invention. For example, although a particular material has been described as the preferred open loop element cover material, other covers having similar open loop elements may also be used in accordance with the present invention. Similarly, although a preferred roller core material and a preferred adhesive have been described, other materials may be used in accordance with the present invention.

What is claimed is:

1. A paint roller comprising:
   a cylindrical core having an outer surface; and
   a cover bonded to the outer surface of the cylindrical core, the cover comprising an open web of a plurality of interengaged continuous crinkled coarse filaments of resilient polymeric material, and a coating over the filaments to permanently bond the filaments together at points where they touch, to form a plurality of open loop elements having substantial interstitial open areas wherein the cover has inner and outer surfaces with portions of the cover proximate the inner surface having a higher concentration of filaments than portions proximate the outer surface, and wherein the inner surface is bonded to the outer surface of the cylindrical core.

2. The paint roller of claim 1 wherein the cover is spirally wound on the outer surface of the cylindrical core in edge-to-edge relationship to provide a continuous cover over essentially the entire outer surface of the cylindrical core.

3. The paint roller of claim 1 wherein the crinkled coarse filaments of resilient material are of a thermoplastic polymeric material.

4. The paint roller of claim 1 wherein the cover is bonded to the outer surface of the cylindrical core by a two part epoxy.

5. The paint roller of claim 4 wherein the cylindrical core is a phenolic impregnated paper tube.

6. A paint applicator comprising:
   a cylindrical core substrate member having a first surface;
   handle means connected to the substrate member; and
   a cover bonded to the first surface of the substrate member, the cover comprising an open web of a plurality of interengaged filaments of crinkled coarse resilient material bonded together at points where they touch to form a plurality of open loop elements having substantial interstitial open areas.

7. The paint applicator of claim 6 wherein the cover is spirally wound on the outer surface of the cylindrical core in edge-to-edge relationship to provide a continuous cover over essentially the entire outer surface of the cylindrical core.

8. The paint applicator of claim 6 wherein the filaments are of a thermoplastic polymeric material.

9. The paint applicator of claim 6 wherein the cover has first and second major surfaces with portions of the cover proximate the first major surface having a higher concentration of filaments than portions proximate the second major surface, and wherein the first major surface is bonded to the first surface of the substrate.

10. The paint applicator of claim 6 wherein the cover is bonded to the first surface of the substrate member by a two part epoxy.

11. The paint applicator of claim 10 wherein the substrate member is a phenolic impregnated paper tube.

12. A method of forming paint rollers, the method comprising:
    providing a cylindrical core having inner and outer surfaces and having a length greater than a desired paint roller length;
    bonding, with a two part epoxy, an open web of a plurality of interengaged continuous crinkled coarse filaments of resilient thermoplastic polymeric material bonded together at points where they touch to form a plurality of open loop elements having substantial interstitial open areas spirally to the outer surface of the cylindrical core, wherein the open web has first and second major surfaces with portions of the web proximate the first major surface having a higher concentration of filaments than portions proximate the second major surface, and wherein the first major surface is bonded to the outer surface of the cylindrical core; and
    cutting, from the core having the open web bonded thereto, paint rollers of the desired paint roller length.

13. The method of claim 12 wherein the open web has a width which is less than the desired paint roller length.

14. The method of claim 13 wherein the open web has a width of about three inches.

15. A method of producing a texture surface with texture paint material, the method comprising:
    applying texture paint material to a texture paint roller having a cylindrical core and a cover bonded to its outer surface, the cover comprising an open web of a plurality of interengaged continuous crinkled coarse filaments of resilient material which are bonded together at points where they touch to form a plurality of open loop elements having substantial interstitial open areas; and
    applying the texture paint material to a surface by rolling the texture paint roller over the surface, the open loop elements creating surface texture effects in the applied texture paint material as the texture paint roller is rolled.

* * * * *